United States Patent
Laureano et al.

(10) Patent No.: US 10,190,495 B2
(45) Date of Patent: Jan. 29, 2019

(54) GEARED TURBOFAN ENGINE WITH INTER-SHAFT DEFLECTION FEATURE

(71) Applicant: United Technologies Corporation, Hartford, CT (US)

(72) Inventors: Pedro Laureano, Atlantic Beach, FL (US); Frederick M. Schwarz, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 727 days.

(21) Appl. No.: 14/433,779

(22) PCT Filed: Mar. 12, 2013

(86) PCT No.: PCT/US2013/030351
§ 371 (c)(1),
(2) Date: Apr. 6, 2015

(87) PCT Pub. No.: WO2014/058463
PCT Pub. Date: Apr. 17, 2014

(65) Prior Publication Data
US 2015/0247454 A1    Sep. 3, 2015

Related U.S. Application Data

(60) Provisional application No. 61/711,256, filed on Oct. 9, 2012.

(51) Int. Cl.
*F01D 5/02* (2006.01)
*F02C 3/10* (2006.01)
(Continued)

(52) U.S. Cl.
CPC ............... *F02C 3/10* (2013.01); *F01D 5/026* (2013.01); *F01D 21/045* (2013.01); *F02C 3/107* (2013.01);
(Continued)

(58) Field of Classification Search
CPC .. F01D 5/026; F02C 3/10; F02C 3/107; F02C 7/06; F02C 7/36; F04D 29/043;
(Continued)

(56) References Cited

U.S. PATENT DOCUMENTS 3,722,058 A  *  3/1973  Corsmeier .............. B23P 19/00
                                                                29/270
4,046,430 A      9/1977  Buono et al.
(Continued)

FOREIGN PATENT DOCUMENTS

EP        1087101 A2      3/2001

OTHER PUBLICATIONS

European Search Report for EP Application No. 13845952.4 dated Apr. 6, 2016.
(Continued)

*Primary Examiner* — Logan Kraft
*Assistant Examiner* — Christopher R Legendre
(74) *Attorney, Agent, or Firm* — Carlson, Gaskey & Olds, P.C.

(57) ABSTRACT

A disclosed gas turbine engine includes a compressor section including a first compressor disposed axially forward of a second compressor, a combustor in fluid communication with the compressor section and a turbine section in fluid communication with the combustor. The turbine section includes a first turbine driving the first compressor and a second turbine driving the second compressor. An inner shaft defines a driving link between the second compressor and the second turbine and an outer shaft defines a driving link between the first compressor and the first turbine. The inner shaft and the outer shaft are concentric about a common axis of rotation. A bumper is disposed on the inner shaft within an axial region common to an aft portion of the
(Continued)

outer shaft for accommodating interaction between the inner and outer shafts during high load conditions.

11 Claims, 3 Drawing Sheets

(51) Int. Cl.
    *F02C 3/107*     (2006.01)
    *F02C 7/06*     (2006.01)
    *F02C 7/36*     (2006.01)
    *F04D 29/054*     (2006.01)
    *F01D 21/04*     (2006.01)

(52) U.S. Cl.
    CPC ............... *F02C 7/06* (2013.01); *F02C 7/36* (2013.01); *F04D 29/054* (2013.01); *F05D 2250/311* (2013.01); *F05D 2250/36* (2013.01); *Y02T 50/672* (2013.01); *Y10T 29/49321* (2015.01)

(58) Field of Classification Search
    CPC ...... F04D 29/053; F04D 29/44; F04D 29/054; F05D 2250/36
    See application file for complete search history.

(56) References Cited

U.S. PATENT DOCUMENTS

| | | |
|---|---|---|
| 4,141,212 A | 2/1979 | Koschier |
| 4,502,274 A | 3/1985 | Girault |
| 4,754,983 A | 7/1988 | Kruger |
| 4,952,076 A | 8/1990 | Wiley, III et al. |
| 5,211,535 A | 5/1993 | Martin et al. |
| 5,215,385 A | 6/1993 | Ide |
| 5,537,814 A * | 7/1996 | Nastuk ............ F01D 5/066 60/796 |
| 5,971,706 A | 10/1999 | Glista et al. |
| 6,131,914 A | 10/2000 | Proveaux |
| 6,619,908 B2 | 9/2003 | Bruno et al. |
| 6,966,191 B2 | 11/2005 | Fukutani et al. |
| 7,140,109 B2 | 11/2006 | Dourlens et al. |
| 7,153,091 B2 * | 12/2006 | Stephenson ....... F01D 21/045 415/174.4 |
| 7,625,177 B2 | 12/2009 | Ivakitch |
| 7,661,928 B2 | 2/2010 | Bart et al. |
| 9,291,070 B2 * | 3/2016 | Fielding ............ F01D 5/026 |
| 2006/0086090 A1 | 4/2006 | Kilkenny et al. |
| 2010/0027926 A1 | 2/2010 | Fang et al. |
| 2010/0043394 A1 * | 2/2010 | Pero ................. F01D 17/14 60/226.3 |
| 2012/0195753 A1 | 8/2012 | Davis et al. |
| 2012/0257960 A1 | 10/2012 | Reinhardt et al. |
| 2015/0247454 A1 * | 9/2015 | Laureano ........... F01D 5/026 415/60 |

OTHER PUBLICATIONS

International Preliminary Report on Patentability for International Application No. PCT/US2013/030351 dated Apr. 23, 2015.
International Search Report and Written Opinion for International Application No. PCT/US2013/030351 dated Jun. 27, 2013.

* cited by examiner

GEARED TURBOFAN ENGINE WITH INTER-SHAFT DEFLECTION FEATURE

CROSS REFERENCE TO RELATED APPLICATION

This application claims priority to U.S. Provisional Application No. 61/711,256 filed on Oct. 9, 2012.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. An interaction between shafts of the high and low spool is considered for extreme operational conditions to safeguard against possible inter-shaft contact and wear.

Accordingly, turbine engine manufacturers continue to seek further improvements to engine performance including improvements that consider potential interactions between relative rotating components during extreme operational conditions.

SUMMARY

A turbine engine according to an exemplary embodiment of this disclosure, among other possible things includes a compressor section including a first compressor section and a second compressor section, a turbine section including a first turbine section driving the first compressor section through an inner shaft and a second turbine section driving the second compressor section through an outer shaft, and a bumper located between the inner shaft and the outer shaft for accommodating interaction between the inner shaft and the outer shaft.

In a further embodiment of the foregoing turbine engine, the bumper includes a portion of one of the inner and outer shafts.

In a further embodiment of any of the foregoing turbine engines, the bumper includes a portion of the inner shaft.

In a further embodiment of any of the foregoing turbine engines, the bumper includes a bumper diameter greater than diameters of the inner shaft surrounding the bumper diameter.

In a further embodiment of any of the foregoing turbine engines, a ratio of the bumper diameter to the surrounding inner shaft diameter is between about 0.932 and about 1.132.

In a further embodiment of any of the foregoing turbine engines, the outer shaft includes an aft end disposed annularly about the bumper.

In a further embodiment of any of the foregoing turbine engines, includes a fastening member attached to the aft end of the inner shaft within an axial length common with the bumper.

In a further embodiment of any of the foregoing turbine engines, the inner shaft includes a flange extending radially outward and spaced apart axially aft of the bumper.

In a further embodiment of any of the foregoing turbine engines, includes a plurality of fan blades rotatable about an axis and driven by the turbine section through a geared architecture.

A gas turbine engine according to an exemplary embodiment of this disclosure, among other possible things includes a compressor section including a first compressor and a second compressor, a turbine section including a first turbine driving the first compressor and a second turbine driving the second compressor, an inner shaft defining a driving link between the second compressor and the second turbine, an outer shaft defining a driving link between the first compressor and the first turbine, wherein the inner shaft and the outer shaft are concentric about a common axis of rotation, and a bumper disposed on the inner shaft within an axial region common to an aft portion of the outer shaft for accommodating interaction between the inner and outer shafts.

In a further embodiment of the foregoing gas turbine engine, the inner shaft includes a first diameter within the axial region on either side of the bumper and the bumper comprises a bumper diameter larger than the first diameter.

In a further embodiment of any of the foregoing gas turbine engines, a ratio of the bumper diameter to the first diameter is between about 0.932 and about 1.132.

In a further embodiment of any of the foregoing gas turbine engines, the outer shaft includes a threaded outer diameter for receiving a fastening member within the axial region.

In a further embodiment of any of the foregoing gas turbine engines, the inner shaft includes a radially extending flange that is disposed aft of the bumper and the axial region.

In a further embodiment of any of the foregoing gas turbine engines, the bumper is continuous about a circumference of the inner shaft within the axial region.

A method of assembling a gas turbine engine according to an exemplary embodiment of this disclosure, among other possible things includes supporting an inner shaft about an axis of rotation, and supporting an outer shaft concentric with the inner shaft about the axis of rotation. The outer shaft includes an aft portion and the inner shaft includes a bumper diameter within an axial region common with the aft portion of the outer shaft. The bumper diameter is greater than a shaft diameter disposed on either axial side of the bumper diameter.

In a further embodiment of the foregoing method, a ratio of the bumper diameter to the shaft diameter is between about 0.932 and about 1.132.

In a further embodiment of any of the foregoing methods, includes attaching a fastening member to the aft portion of the inner shaft within the axial region aligned with the bumper diameter.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
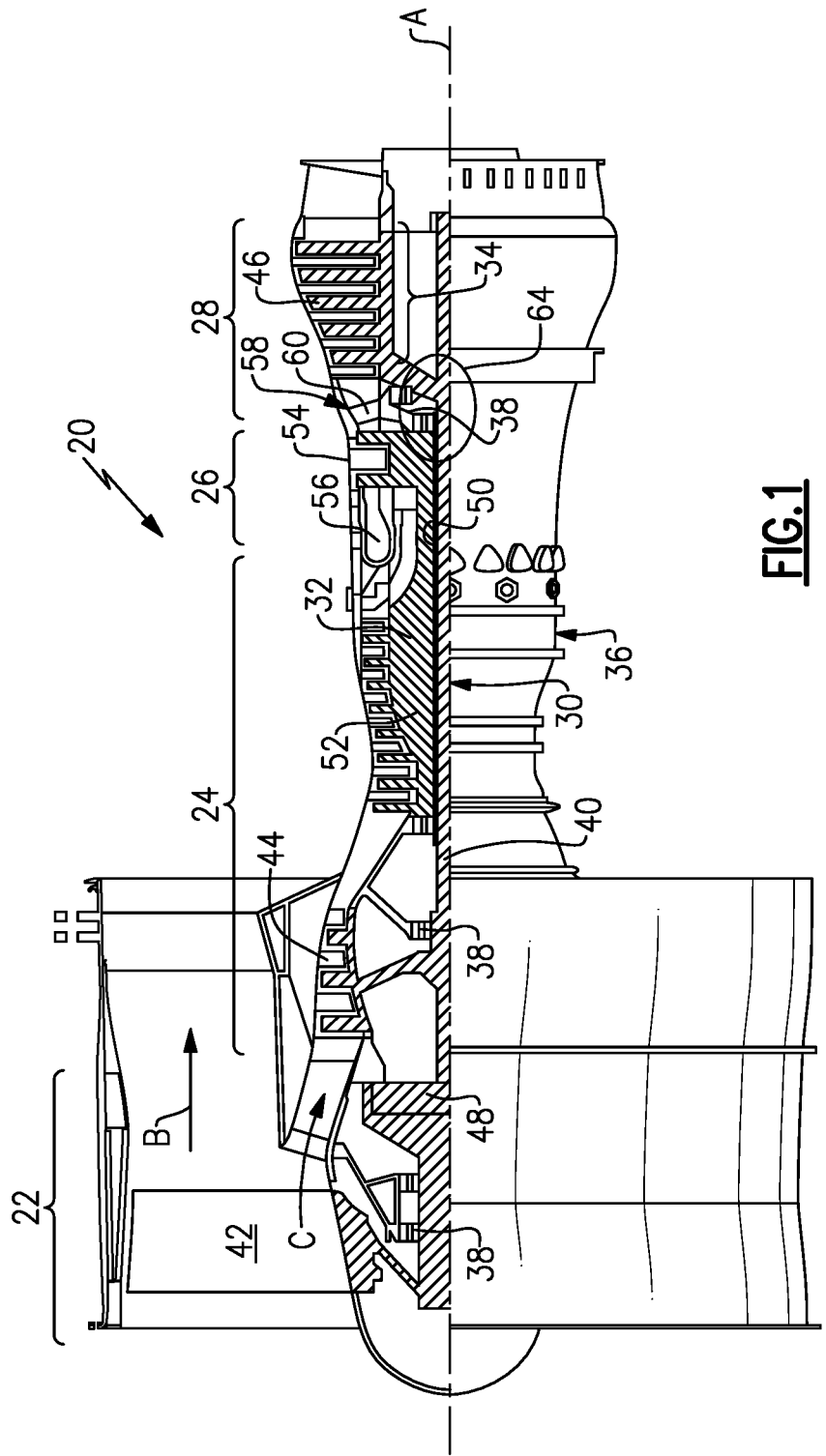
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects and defines a driving link between the fan section 22, a low pressure (or first) compressor section 44 and a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects and defines a driving link between a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core flow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°R)]^{0.5}$. The "Low corrected fan tip speed", as disclosed herein according to one non-limiting embodiment, is less than about 1150 ft/second.

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

An interface region 64 between an aft portion of the outer shaft 50 and the inner shaft 40 is defined to limit possible intershaft contact during extreme operational conditions. Relative close proximity between the concentric rotating inner shaft 40 and outer shaft 50 are considered and localized shaft configurations are tailored to safeguard the inner and outer shafts 40, 50 from potential inter-shaft contact.

Figure 2:
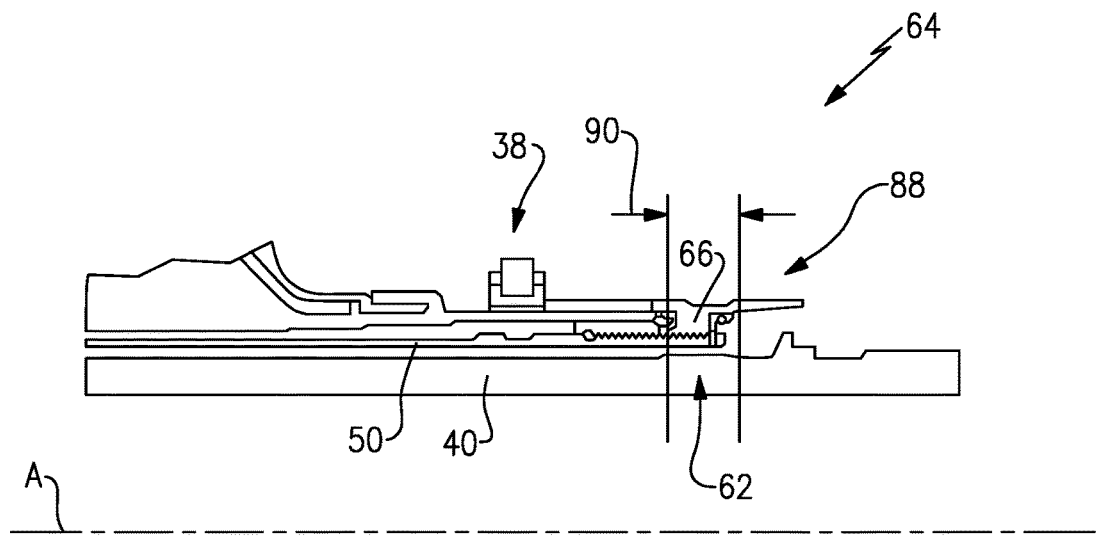
FIG. 2 is a cross-section of an example inter-shaft interface region.
Figure 3:
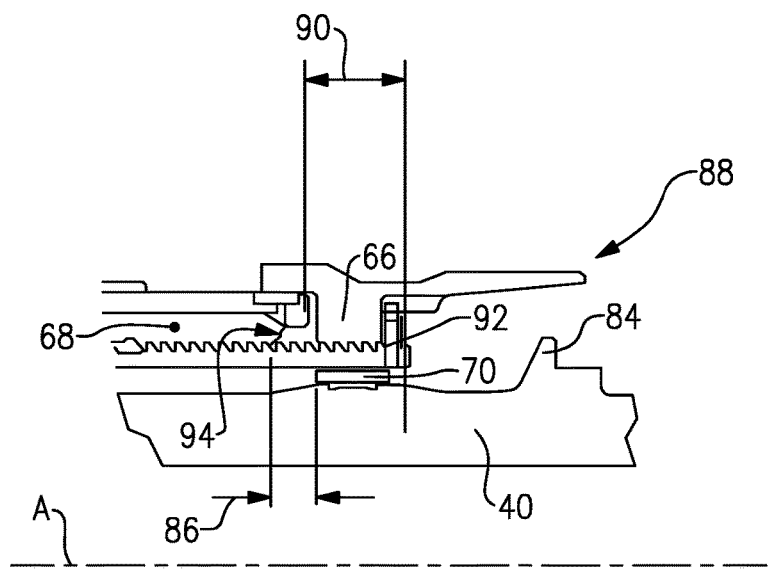
FIG. 3 is an enlarged section of the example inter-shaft interface region.
Figure 4:
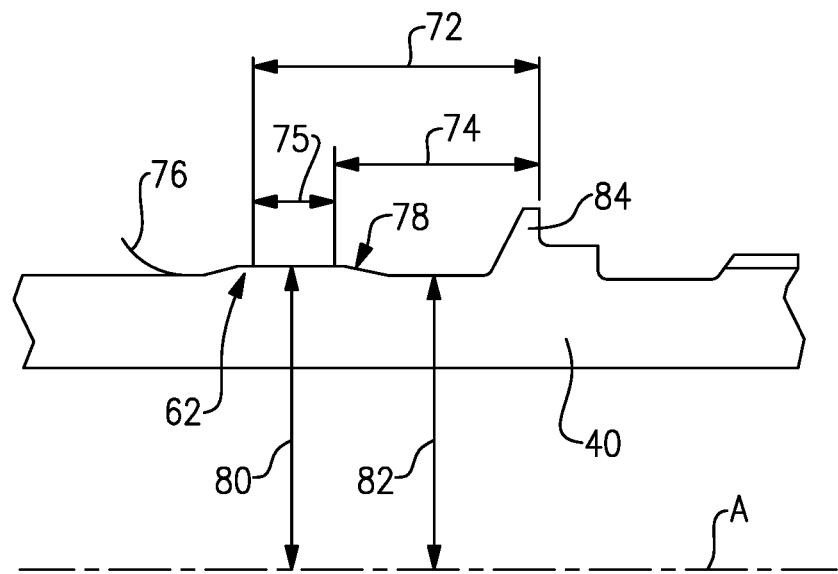
FIG. 4 is a cross-section of an example bumper on an inner shaft.

Referring to FIGS. 2, 3, and 4, with continued reference to FIG. 1, the example outer shaft 50 includes an aft portion 88 disposed within the interface region 64 that is axially aligned with a bumper 62 formed on the inner shaft 40. The example bumper 62 reduces potential inter-shaft loads resulting from contact between the inner and outer shafts 40, 50 possible during extreme operational conditions.

The bumper 62 comprises additional material disposed annularly about the inner shaft 40 that defines a bumper diameter 80 (FIG. 4). The example bumper diameter 80 is disposed between smaller shaft diameters indicated as first diameters 82 of the inner shaft 40. The bumper diameter 80 reduces the effects of loads experienced during inter-shaft contact. The bumper diameter 80 is disposed within the axial region 90 where the aft portion 88 of the outer shaft 50 overlaps inner shaft 40.

The example configuration protects against possible intershaft contact that may occur during extreme maneuver loads or during fan-blade-out conditions. The location of the bumper 62 shields critical points and shaft locations from unwanted interaction.

In the disclosed example, a nut 66 provided for securing portions of a bearing assembly 38 (FIG. 2) to the outer shaft 50 is aligned within the axial region 90 and the bumper 62. The nut 66 is received on threads 92 defined on the aft portion 88 of the outer shaft 50. A forward side 94 of the nut 66 is spaced apart a distance 86 from a forward part of the bumper diameter 80. The offset between the forward side 94 and the bumper 62 provides a clearance distance 86 with respect to the nut 66. The clearance distance 86 spaces susceptible interfaces from an inter-shaft contact zone 70 defined by the bumper 62. Moreover, the bumper 62 defines the region in which potential inter-shaft contact may occur to shield other shaft locations and features within the aft portion of the outer shaft 50. Furthermore, the increased material provided on the bumper diameter 80 reduces local stresses within the inner shaft 40.

In the disclosed example, interaction between the bumper 62 and the outer shaft proximate the nut 66 (FIG. 3) does not compromise the nut 66 and thereby the integrity of the bearing assembly 38. Moreover, the extra material forming the bumper 62 on the low pressure turbine shaft 40 lowers local stress, thereby reducing possible damage to the shaft 40 from such an interaction.

In the disclosed example, possible contact loads between the inner shaft 40 and the outer shaft 50 are below about 10,000 pounds (4535 kg). Contact loads are determined for each engine application depending on many factors including airframe and operator requirements as well as government safety standards and guidelines. Moreover, the load in a fan blade out condition (FBO) is substantially large due to imbalanced forces encountered on the shaft. Accordingly, for FBO conditions, the example bumper 62 is provided to enable continued operation upon encountering contacts loads in excess of about 10,000 pounds.

Referring to FIG. 4, the shaft 40 includes multiple diameters in relation to a flange 84. The disclosed bumper 62 includes a bumper diameter 80 spaced apart from a radially extending flange 84. In the disclosed example, the bumper diameter 80 extends between a first distance 72 and a second distance 74 from the flange 84. The bumper 62 is a flat surface disposed parallel to the axis A at the bumper diameter 80 between the first and second distances 72, 74. Radii 76 and 78 are disposed on either axial side of the bumper 62 and taper from the bumper diameter 80 to the first diameter 82. The bumper diameter 80 is larger than the first diameter to define the inter-shaft contact zone 70 within the axial region 90. The location of the bumper 62 is determined relative to the outer shaft 50 to protect specific features and locations that may be more susceptible to damage caused by intershaft interactions.

The example nut 66 is disposed within the bearing assembly 38 and is forward of a seal nut 68. An axial deflection of the seal nut 68 in this example is accommodated by the bumper 62 and the distance 86 from the seal nut 68. Deflections of the inner shaft 40 and the outer shaft 50 are absorbed by the increased material and location provided by the bumper diameter 80 of the bumper 62. The example bumper 62 is therefore capable of accommodating contact loads experienced during extreme operational conditions and during FBO events.

In one disclosed non-limiting dimensional embodiment, the diameter 80 is approximately 0.070 inches (0.178 cm) larger than the diameter 82 between the forward and aft distances 72, 74. In another non-limiting dimensional embodiment, the diameter 80 is approximately 0.50 inches (0.127 cm) larger than the diameter 82. The example bumper diameter 80 is related to the first diameter according to a ratio of the bumper diameter 80 to the first diameter 82. In a disclosed example, the ratio is between about 0.932 and about 1.132. In another disclosed example, the ratio between the bumper diameter 80 and the first diameter 82 is about 1.032.

In an example embodiment, the diameter 80 is about 1.600 inches (4.064 cm) and the diameter 82 is about 1.550 inches (3.937 cm). In still a further non-limiting dimensional embodiment, the diameter 80 is about 1.610 inches (4.0894 cm) and the diameter 82 is about 1.560 inches (3.962 cm). It should be understood, that the specific dimensions are exemplary and may be different based engine size, configuration and operational requirements.

The location and length of the bumper diameter 80 are further related to define the desired inter-shaft contact zone 70. The example bumper diameter 80 includes an axial region 75 having a length defined between the first and second distances 72, 74. The axial region 75 corresponds with the bumper diameter 80 to define the inter-shaft contact zone 70 within the axial region 90. In the disclosed example, the bumper diameter 80 is related to the axial region 75 according to a ratio of between about 3.00 and about 4.00. In another embodiment, the bumper diameter is related to the axial region 75 according to a ratio of about 3.57.

In one example embodiment, the distance 72 is about 1.600 inches (4.064 cm) and the distance 74 is about 1.100 inches (2.794 cm). In another non-limiting dimensional embodiment, the distance 72 is about 1.579 inches (4.012 cm) and the distance 74 is about 1.129 inches (2.867 cm). It should be understood that the above dimensions are exemplary and that other specific sizes of the example disclosed bumper are within the contemplation and scope of this disclosure based on potential contact loads determined to be possible during operation.

Figure 5:
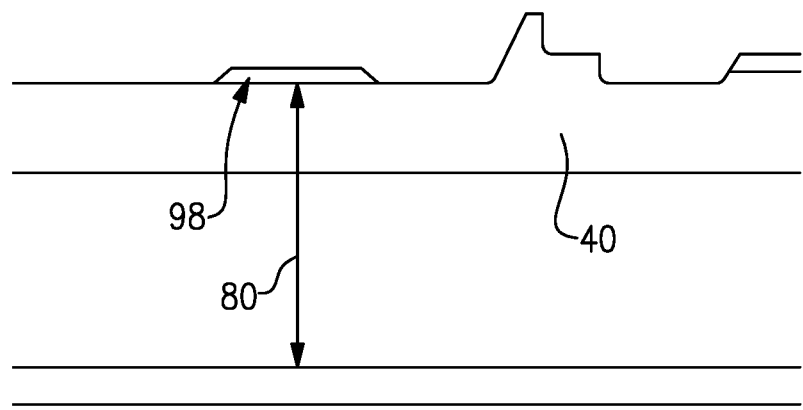
FIG. 5 is another example inter-shaft interface region.

Referring to FIG. 5, another example interface region 96, a bumper 98 is disclosed as a part separate from the inner shaft 40. The example bumper 98 is formed as an additional part formed of a benign contact material, such as a composite ring. The bumper 98 defines a safe inter-shaft contact zone 70 along the areas where the two shafts overlap.

The example bumpers 62, 98 reduce possible intershaft loads to below a desired threshold to protect rotating components from potential impacts. In one disclosed embodiment the intershaft rub load is below about 10,000 pounds (4535 kg). In another disclosed example embodiment, the bumper 62 reduces intershaft rub loads to less than about 6,600 pounds (2993 kg).

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine comprising:
   a compressor section including a first compressor section and a second compressor section;
   a turbine section including a first turbine section driving the first compressor section through an inner shaft and a second turbine section driving the second compressor section through an outer shaft, wherein the outer shaft includes an aft end;
   a bearing assembly supporting rotation of the outer shaft, the bearing assembly spaced axially forward of the aft end;
   a bumper located between the inner shaft and the outer shaft for accommodating interaction between the inner shaft and the outer shaft, wherein the aft end of the outer shaft is disposed annularly about the bumper; and
   a fastening member attached to the aft end of the outer shaft for securing a portion of the bearing assembly to the outer shaft, wherein the fastening member is spaced axially aft of the bearing assembly within an axial length disposed at least partially about the bumper.

2. The turbine engine as recited in claim 1, wherein the bumper comprises a portion of one of the inner and outer shafts.

3. The turbine engine as recited in claim 1, wherein the bumper comprises a portion of the inner shaft.

4. The turbine engine as recited in claim 3, wherein the bumper comprises a bumper diameter greater than diameters of the inner shaft surrounding the bumper diameter.

5. The turbine engine as recited in claim 4, wherein a ratio of the diameters of the inner shaft surrounding the bumper diameter is 1.032.

6. The turbine engine as recited in claim 1, wherein the inner shaft includes a flange extending radially outward and spaced apart axially aft of the bumper.

7. The turbine engine as recited in claim 1, including a plurality of fan blades rotatable about an axis and driven by the turbine section through a geared architecture.

8. A gas turbine engine comprising:
   a compressor section including a first compressor and a second compressor;
   a turbine section including a first turbine driving the first compressor and a second turbine driving the second compressor;
   an inner shaft defining a driving link between the second compressor and the second turbine;
   an outer shaft defining a driving link between the first compressor and the first turbine, wherein the inner shaft and the outer shaft are concentric about a common axis of rotation;
   a bearing assembly supporting rotation of the outer shaft, the bearing assembly spaced axially forward of an aft end portion of the outer shaft;
   a bumper disposed on the inner shaft within an axial region common to the aft end portion of the outer shaft for accommodating interaction between the inner and outer shafts; and
   a fastener attached to the aft end portion within the axial region of the aft end portion of the outer shaft, the fastener threaded to a threaded outer diameter of the outer shaft at the aft end portion.

9. The gas turbine engine as recited in claim 8, wherein the inner shaft includes a first diameter within the axial region on either side of the bumper and the bumper comprises a bumper diameter larger than the first diameter.

10. The gas turbine engine as recited in claim 8, wherein the inner shaft includes a radially extending flange that is disposed aft of the bumper and the axial region.

11. The gas turbine engine as recited in claim 8, wherein the bumper is continuous about a circumference of the inner shaft within the axial region.

* * * * *